Aug. 16, 1932.  R. FURRER  1,872,272
RAILWAY TANK CAR
Original Filed June 29, 1929   2 Sheets-Sheet 2
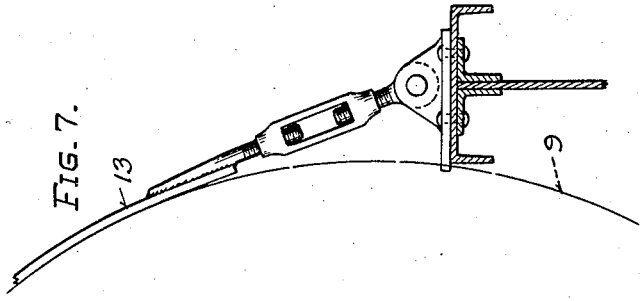
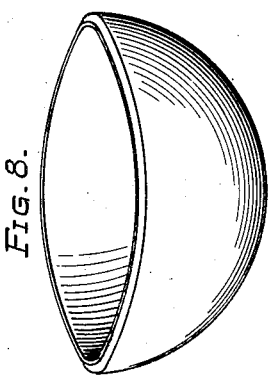
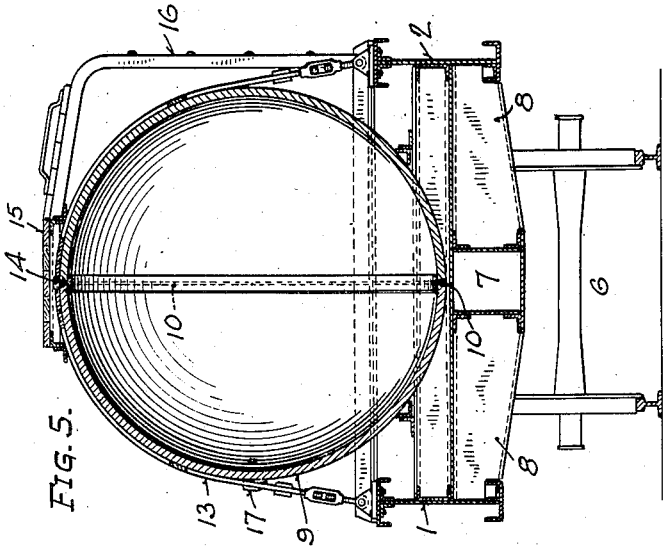
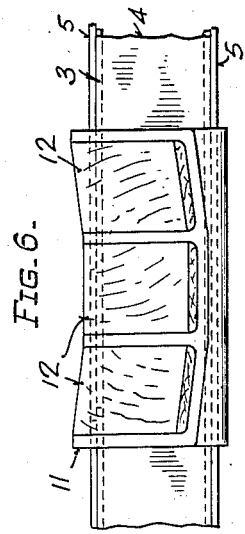
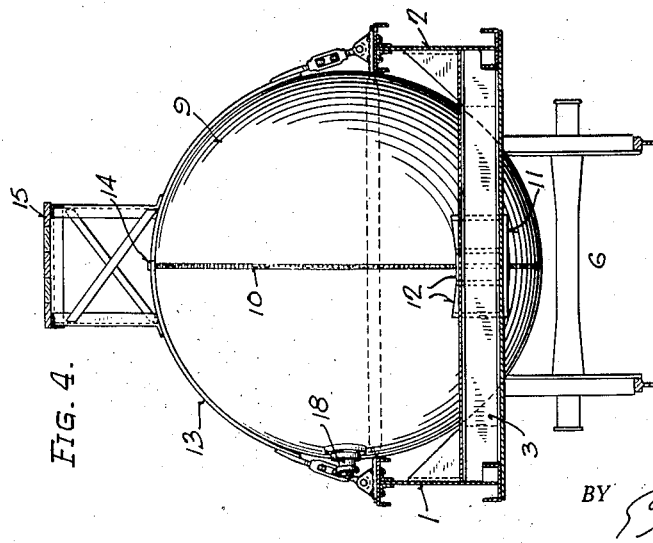
INVENTOR.
Rudolph Furrer
BY
ATTORNEY.

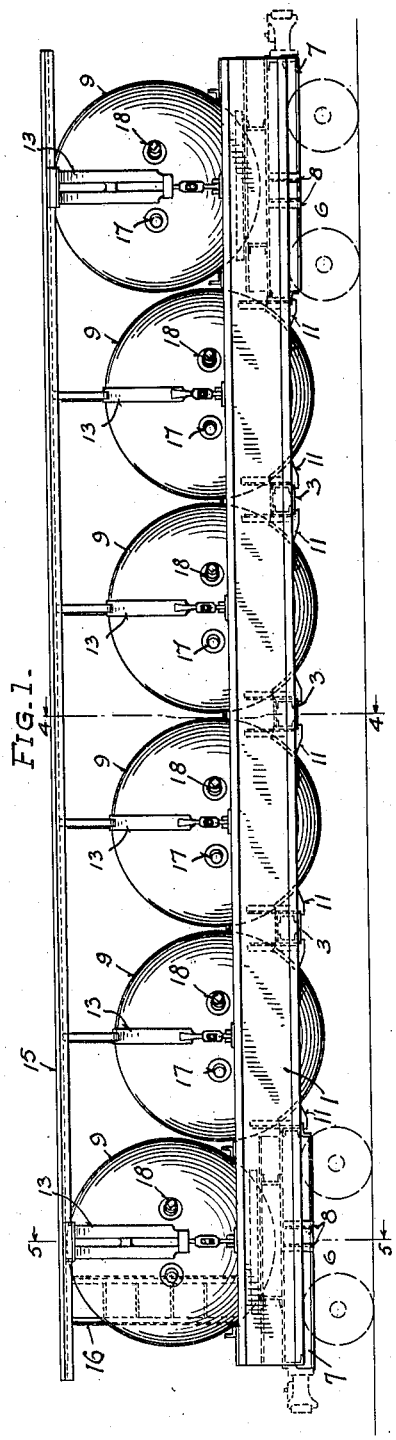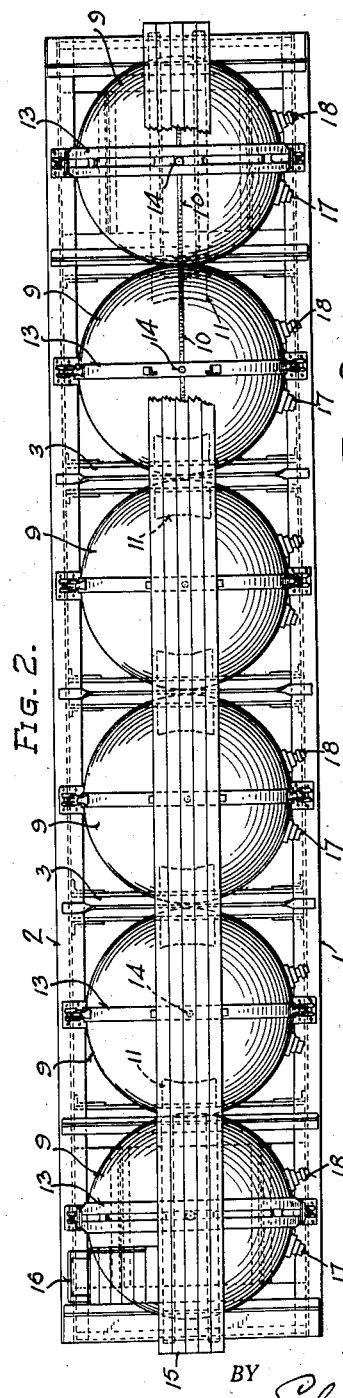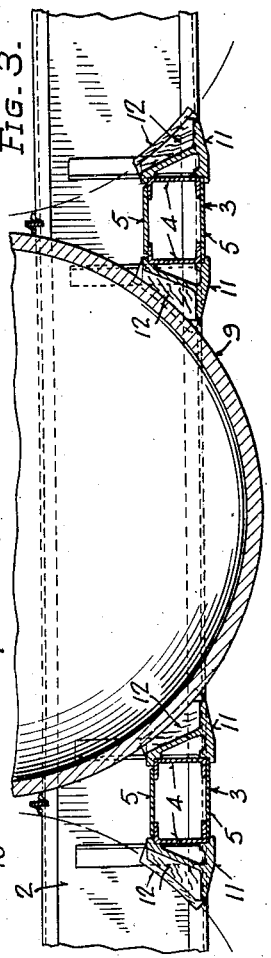

Patented Aug. 16, 1932

1,872,272

UNITED STATES PATENT OFFICE

RUDOLPH FURRER, OF WHITEFISH BAY, WISCONSIN, ASSIGNOR TO A. O. SMITH CORPORATION, OF MILWAUKEE, WISCONSIN, A CORPORATION OF NEW YORK

RAILWAY TANK CAR

Application filed June 29, 1929, Serial No. 374,713. Renewed April 4, 1932.

This invention relates to a railway tank car and more specifically to multi-unit tank cars adapted for the transportation of fluids under high pressures.

The invention is particularly applicable in the transportation of helium and other gases under high pressures, such as 2,000 lbs. per square inch.

The object of the invention is to provide a multi-unit tank car which is light in weight and which may be more readily and economically manufactured.

Another object is to provide a car having a low center of gravity for high speed transportation.

Another object is to provide a car which is particularly adaptable for war-time use and in which the tanks are not readily injured by railway wrecks or other accidents.

The invention consists generally in a tank car comprising a truck supported car frame provided with spherical tanks independently nested and supported between the frame members with means for holding said tanks in position.

A specific embodiment of the invention is illustrated in the accompanying drawings, in which:

Figure 1 is a side elevation of the tank car.

Fig. 2 is a top plan view of the car.

Fig. 3 is a central longitudinal section through a portion of the car showing supports for the tanks.

Fig. 4 is a section on line 4—4 of Fig. 1.

Fig. 5 is a section on line 5—5 of Figure 1.

Fig. 6 is a detail illustrating the supporting cradle.

Fig. 7 is a detail showing a fastening for the holding strap for the tanks.

Fig. 8 is a detail showing the valve construction on the tanks.

Fig. 9 is a detail section showing the construction of the tank.

The car has a body comprising side sills 1 and 2 extending for the full length of the car and a plurality of cross beams 3 extending between and connecting the side sills. The side sills are preferably of I-beam construction which gives the maximum strength for the weight of the sill. The cross beams are preferably of rectangular cross section and may be composed of two opposed channel members 4 connected by plates 5 which are preferably welded thereto. The cross beams are preferably set in hangers on the side sills and welded or otherwise secured together.

The body of the car is supported on trucks 6 at each end in any suitable manner as employed in railway car construction. Above the trucks at each end the body has a central sill or beam 7 extending longitudinally of the car and held in place by suitable cross beams 8.

Spherical tanks 9, which preferably have a diameter approximating the width of the car body, are arranged on the body the car specifically illustrated having six of these tanks. The tanks are arranged and supported so that the four central tanks are lower than the two end tanks. This is accomplished by supporting the central tanks on the cross beams 3 in a manner allowing the tanks to extend below the beams in the spaces therebetween, while the end tanks are supported above the central sills 7.

This arrangement of the tanks provides a very low center of gravity for the car, allowing greater safety and higher speed in transportation.

The tanks are constructed of hemispherical shells electrically welded together as at 10, as illustrated in Figs. 5 and 9. The shells are preferably formed by pressing the same from flat metal plates, and may be as thick as two inches, depending upon the pressure to be employed in the tanks and the composition and strength of the metal. Where chrome-vanadium steel is employed, the thickness required is about one-half that required for high carbon steel. The shells are preferably welded together by providing a welding groove at their circumferential meeting edges and fusing the metal of the edges by means of an electric arc and filling the groove with welding metal deposited by the arc. Other methods of welding may be employed.

The central tanks are supported on the frame, preferably on the cross beams 3, by means of cradle members 11, as illustrated in Figs. 3 and 6. The cradle members preferably are castings having suitable recesses therein for receiving wood blocks 12 which directly support the tanks. The end tanks are supported above the trucks in any suitable manner as by the cross beams 8. The tanks are held from rolling or otherwise becoming displaced by straps 13 passing over the top, the straps being secured to the side sills as shown in Fig. 7.

The tanks are preferably all independent, one of another, and preferably no connecting means are provided between the tanks and the car frame but each tank is nested or deeply seated in its cradle support and is held in position by the straps 13 or other suitable means that prevent the tanks from being displaced from their cradle supports.

Each tank preferably has an integral projection 14 at the top which extends through a hole in the strap and thereby holds the tank in position at the top.

The car has a suitable platform 15 disposed above the tanks and extending longitudinally of the car for the walking of trainmen. A ladder 16 is provided at one end of the car.

The tanks have safety valves 17 thereon and service valves 18 for the admission and withdrawal of fluid. These valves may be placed in any suitable or handy position with respect to the car so that the tanks may be filled and emptied without obstruction.

The tank car herein described has a low center of gravity adapting it to be advantageously used for high speed transportation. It is particularly designed for transportation of helium and other gases and such a tank car would be especially valuable for transporting gases under pressure for war purposes or for supplying gas for dirigibles or balloons. In case of railroad wrecks or similar accidents, the tanks not being attached to the car frame will be freed from the frame upon breakage of the straps 13 or other fastenings and will independently roll away from the wrecked frame.

As the tanks are all independent one of another, any tank can be removed without disturbing the others by releasing the strap 13 for the particular tank that it is desired to remove. The platform 15 is preferably made in sections for this purpose.

While I have illustrated and described the tank car as provided with a plurality of tanks, a truck supported car frame having a spherical tank constructed independent of the frame and supported between the frame members by a suitable cradle or nesting support and provided with means for holding the tank in position upon said frame is within the scope of my invention.

I claim:

1. A railway tank car, comprising in combination a truck supported car frame, a spherical tank supported by said frame and deeply seated between the frame members, and means fastened to said frame and passing over the top of said tank and holding the tank in position on said frame.

2. A railway tank car, comprising in combination a truck supported car frame, a plurality of spherical tanks independently supported by said frame and deeply seated between the frame members and arranged in a single row longitudinally of the car frame, said tanks being independent one of another, and means engaging said tanks and holding them in position on said frame.

3. A railway tank car, comprising in combination a truck supported car frame, a plurality of spherical tanks independently supported by said frame and deeply seated between the frame members and arranged in a single row longitudinally of the car frame, and separate means engaging each of said tanks and holding the respective tanks independent from each other and in position on said frame, said tanks being independently removable from said frame upon release of their respective holding means.

4. A railway tank car, comprising in combination a truck supported car frame having side sills and spaced cross beams supported by said sills, a plurality of spherical tanks supported by said frame and independently seated between the frame members, and means provided upon said frame for holding each tank in position thereon, said tanks being independently removable from said frame upon release of said holding means.

5. A railway tank car, comprising in combination a frame having side sills and spaced cross beams supported by said sills, trucks arranged near the ends of said frame and supporting the frame, a plurality of spherical tanks arranged in a centrally located row longitudinally of the frame, each tank except the end tanks being deeply seated and independently supported between said side sills, and means for holding each tank in position upon said frame.

6. A railway tank car, comprising in combination a frame having side sills and spaced cross beams supported by said sills, trucks arranged near the ends of said frame and supporting the same, a plurality of spherical tanks arranged in a centrally located row longitudinally of said frame, each tank except the end tanks being deeply seated and independently supported between said side beams, and means for supporting the end tanks above said trucks and at a higher level than the intermediate tanks.

7. A railway tank car, comprising in combination a frame having side sills and spaced cross beams connected with said sills, trucks arranged near the end of said frame and supporting the same, a plurality of spherical tanks arranged in a centrally located row, each tank except the end tanks being deeply seated and independently supported between two of said cross bars, centrally located and longitudinally extending end beams arranged above said trucks, and means for supporting the end tanks above said trucks and central beam at a higher level than the intermediate tanks.

8. A railway tank car, comprising in combination a truck supported car frame having side sills and spaced cross beams, each cross beam consisting of opposed channel members suitably connected to each other and to said side sills, a plurality of spherical tanks supported by said cross beams and deeply seated therebetween, and means engaging said tanks and holding the same in position on said frame.

9. In a railway tank car, a frame, a plurality of spherical tanks supported by said frame and independent means for each tank for securing said tanks in position, each tank upon release of its securing means being readily removable from said frame.

10. In a railway tank car, a frame, a plurality of spherical tanks supported by said frame, and a strap member for each tank having its ends secured to said frame and passing over said tank for securing the latter to said frame, each tank upon release of its securing strap being readily removable from said frame.

11. In a railway tank car, a frame, a plurality of spherical tanks supported by said frame and means for securing said tanks in position, said tanks being free from exterior covering and being readily removable from said frame upon release of said securing means.

In witness whereof I have signed my name, at Milwaukee, Wisconsin, this 25th day of June, 1929.

RUDOLPH FURRER.